(12) United States Patent
Nishio et al.

(10) Patent No.: US 8,343,302 B2
(45) Date of Patent: Jan. 1, 2013

(54) METHOD OF PREPARING HONEYCOMB SEGMENT JOINED BODY

(75) Inventors: Akifumi Nishio, Ena (JP); Takao Tani, Aisai (JP); Jun Inoue, Nishikasugai-gun (JP)

(73) Assignee: NGK Insulators, Ltd., Nagoya (JP)

( * ) Notice: Subject to any disclaimer, the term of this patent is extended or adjusted under 35 U.S.C. 154(b) by 621 days.

(21) Appl. No.: 12/275,010

(22) Filed: Nov. 20, 2008

(65) Prior Publication Data

US 2009/0070982 A1 Mar. 19, 2009

Related U.S. Application Data

(63) Continuation of application No. PCT/JP2008/058817, filed on May 14, 2008.

(30) Foreign Application Priority Data

May 16, 2007 (JP) ................................. 2007-130505

(51) Int. Cl.
*C04B 33/34* (2006.01)
*B29C 65/00* (2006.01)
*C09J 5/00* (2006.01)
*B32B 37/00* (2006.01)
*B32B 3/12* (2006.01)
*B01D 39/14* (2006.01)

(52) U.S. Cl. ..................... 156/312; 156/89.22; 156/296; 428/117; 55/524

(58) Field of Classification Search .................... 156/60, 156/89.11, 89.22, 182, 242, 244.11, 24.13, 156/244.18, 244.19, 244.23, 244.24, 244.26, 156/244.27, 250, 256, 263, 264, 283, 296, 156/311, 312, 538, 539, 556, 559; 428/116, 428/117, 118; 55/522, 524
See application file for complete search history.

(56) References Cited

U.S. PATENT DOCUMENTS

| 6,797,666 B2 * | 9/2004 | Harada et al. ................. 502/180 |
| 2005/0178098 A1 * | 8/2005 | Ono et al. ........................ 55/523 |
| 2006/0254713 A1 * | 11/2006 | Fujita et al. ................... 156/312 |

FOREIGN PATENT DOCUMENTS

| EP | 1 468 801 A1 | 10/2004 |
| JP | A-2000-007455 | 1/2000 |
| JP | A-2000-279729 | 10/2000 |
| JP | A-2004-262670 | 9/2004 |
| WO | WO 2004063122 A1 * | 7/2004 |
| WO | WO 2005/047210 A1 | 5/2005 |

OTHER PUBLICATIONS

Jul. 1, 2010 Search Report issued in European Patent Application No. 08752688.5.

* cited by examiner

*Primary Examiner* — Philip Tucker
*Assistant Examiner* — Brian R Slawski
(74) *Attorney, Agent, or Firm* — Oliff & Berridge, PLC.

(57) ABSTRACT

There is disclosed a method for preparing a honeycomb segment joined body in which a plurality of honeycomb segments are arranged in directions parallel to a first flat surface and a second flat surface of an installation reference jig to install the honeycomb segments in predetermined positions via a paste-like joining material on the installation reference jig by use of the installation reference jig having the first flat surface and the second flat surface forming a right angle therebetween, and then the joining material is dried and cured to join the plurality of honeycomb segments together. In the preparation method, in at least a part of a process of successively installing the plurality of honeycomb segments in the predetermined positions, when a new honeycomb segment is installed, at least a part of the installed honeycomb segments is pressurized and held in the predetermined positions so that the already installed honeycomb segments are not displaced.

10 Claims, 5 Drawing Sheets

METHOD OF PREPARING HONEYCOMB SEGMENT JOINED BODY

CROSS REFERENCE TO RELATED APPLICATIONS

This application is a continuation of International Application No. PCT/JP2008/058817, filed May 14, 2008, and claims priority to Japanese Patent Application No. JP 2007-130505, filed May 16, 2007.

TECHNICAL FIELD

The present invention relates to a method for joining a plurality of honeycomb segments together to prepare a honeycomb segment joined body.

BACKGROUND ART

A honeycomb structure has broadly been used as a filter for collecting dust from an exhaust gas, for example, a diesel particulate filter (DPF) for trapping and removing a particulate matter (particulates) such as soot included in the exhaust gas from a diesel engine or the like.

The honeycomb structure for use in such a purpose is exposed to the rapid temperature change of the exhaust gas or locally generated heat to easily generate a non-uniform temperature distribution in the structure, and this causes a problem that cracks are generated and the like. To solve such problems, a method has been suggested in which the honeycomb structure is constituted of a plurality of honeycomb segments, and the honeycomb segments are integrally joined together by use of a joining material constituted of an elastic material, whereby a thermal stress exerted on the honeycomb structure is relaxed (see Patent Document 1).

Figure 5:
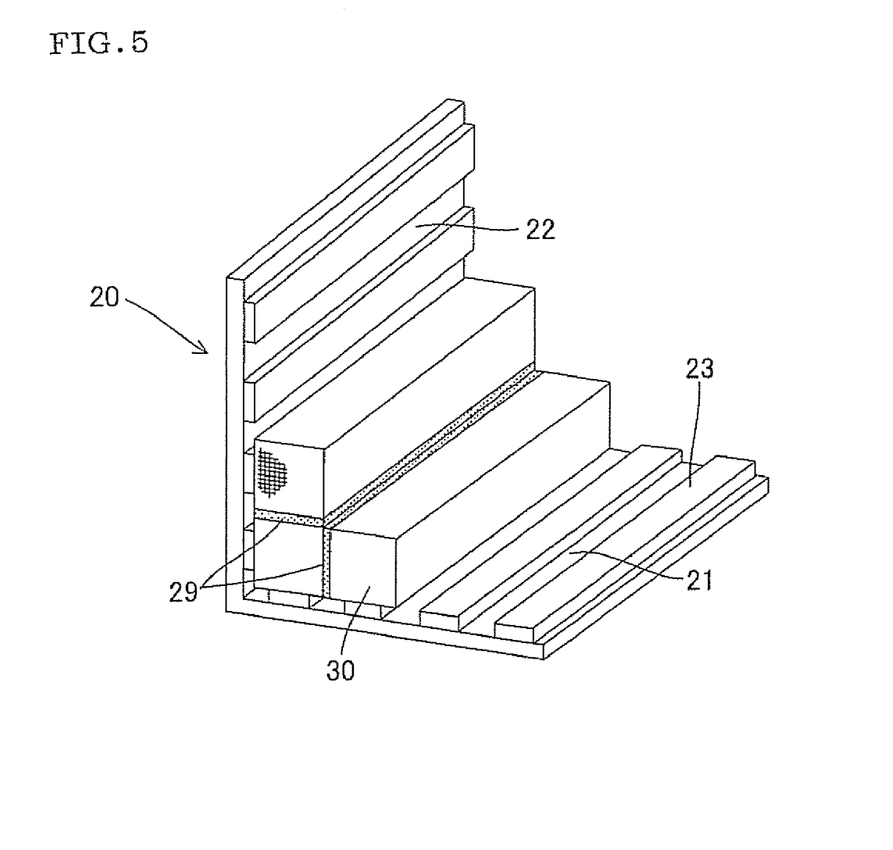
FIG. 5 is an explanatory view showing an installation method of the honeycomb segments by use of an installation reference jig.
Figure 6:
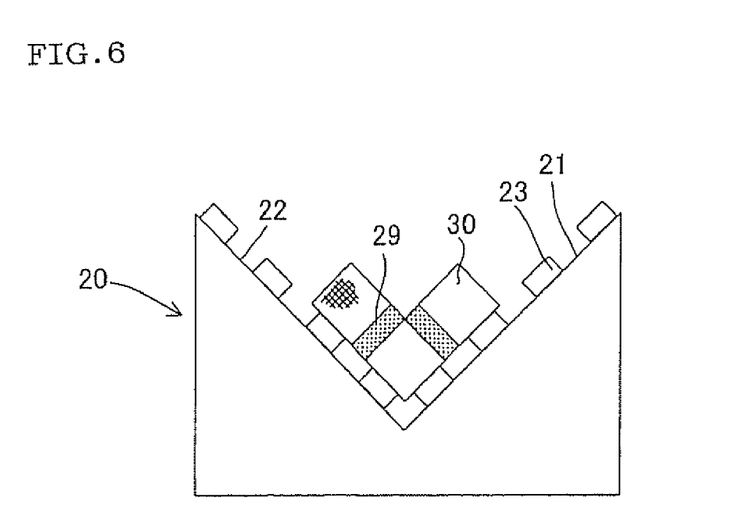
FIG. 6 is an explanatory view showing the installation method of the honeycomb segments by use of the installation reference jig.

The honeycomb structure (a honeycomb segment joined body) constituted by joining the plurality of honeycomb segments together is usually prepared by arranging a plurality of honeycomb segments 30 in directions parallel to a first flat surface 21 and a second flat surface 22 of an installation reference jig 20 to install the segments in predetermined positions via a paste-like joining material 29 on the installation reference jig 20 by use of the jig having two flat surfaces (the first flat surface 21 and the second flat surface 22) forming a right angle therebetween as shown in FIG. 5, and then drying and curing the joining material 29. The first flat surface 21 and the second flat surface 22 are provided with pads 23 which come in contact with the honeycomb segments 30 if necessary. It is to be noted that in the example of FIG. 5, the first flat surface 21 of the installation reference jig 20 is parallel to a horizontal direction, and the second flat surface 22 is parallel to a vertical direction. However, as shown in FIG. 6, the installation reference jig is sometimes used so that each of the first flat surface 21 and the second flat surface 22 forms an angle of 45° with respect to a horizontal plane (e.g., see Patent Document 2).

Figure 7:
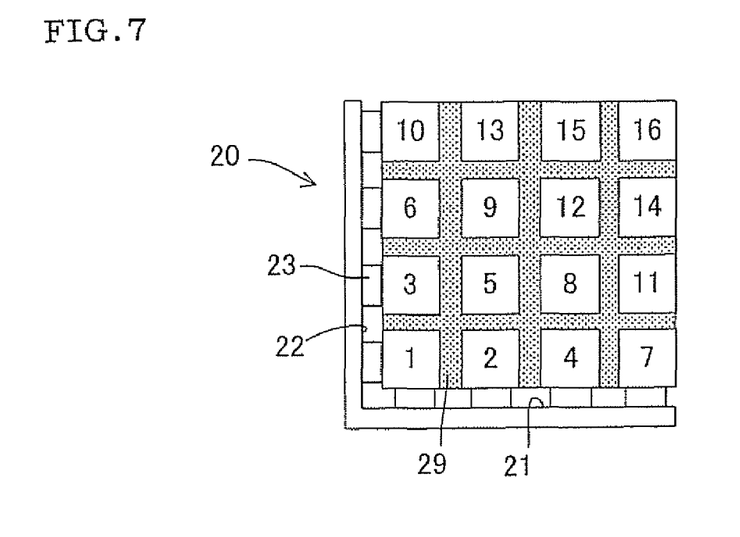
FIG. 7 is an explanatory view showing an ideal installation state after all the honeycomb segments have been installed.

FIG. 7 shows an ideal installation state after completely installing all the honeycomb segments in a case where 16 honeycomb segments 1 to 16 in total are installed in four rows along the direction parallel to the first flat surface 21 and four rows along the direction parallel to the second flat surface 22. The honeycomb segments 1 to 16 are thus arranged at equal intervals without being displaced, and the whole shape is adjusted in the ideal state. It is to be noted that the reference numerals 1 to 16 attached to the honeycomb segments in the drawing indicate an installation order. It is most general that the honeycomb segments are successively installed in a staircase pattern from the honeycomb segment 1 to be first installed to the honeycomb segment 16 to be last installed in this manner.

Figure 8:
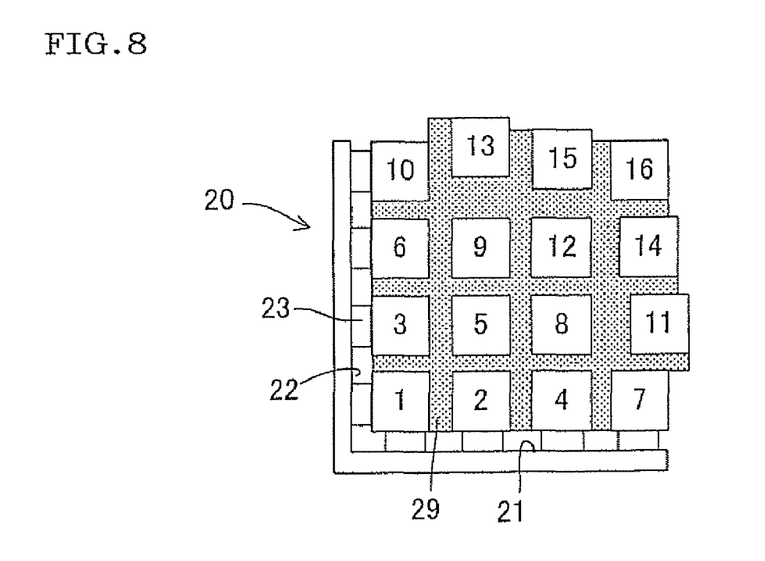
FIG. 8 is an explanatory view showing a state in which displacement is generated in the honeycomb segments.

However, in a case where the honeycomb segments are actually installed by the above method, it is difficult to obtain the ideal installation state shown in FIG. 7, and a state is easily generated in which the honeycomb segments are displaced as shown in, for example, FIG. 8. This is because when a new honeycomb segment is installed in a predetermined position, the new honeycomb segment generates a pressurizing force with respect to the already installed honeycomb segment. That is, the joining material 29 present between the honeycomb segments finally dries and cures owing to a heating treatment or the like to firmly join the honeycomb segments together. However, during the installation of the honeycomb segments, the joining material is a paste-like material having fluidity, and the installed honeycomb segment has a floating state on the joining material 29, and is easily displaced owing to the fluidity of the joining material 29 at a time when an external force is applied.

As shown in an example of FIG. 8, the honeycomb segments 1 to 4, 6, 7 and 10 installed so as to come in contact with the pads 23 of the installation reference jig 20 are hardly displaced owing to frictional resistance to the pads 23, but the other honeycomb segments are easily displaced in a case where the new honeycomb segment is installed as described above. This displacement increases, as the number of the segments to be installed increases and the number of times when the already installed segment is pressurized by the newly installed segment increases.

For example, in FIG. 8, the honeycomb segment 13 is pressurized twice at a time when the honeycomb segment 15 is installed and a time when the honeycomb segment 16 is installed, so that considerably large displacement is easily generated. The honeycomb segment 15 is pressurized only once at a time when the honeycomb segment 16 is installed, and hence the displacement is smaller than that of the honeycomb segment 13. The honeycomb segment 11 is pressurized twice at a time when the honeycomb segment 14 is installed and a time when the honeycomb segment 16 is installed, so that the considerably large displacement is easily generated in the same manner as in the honeycomb segment 13.

Patent Document 1: JP 2000-279729 A
Patent Document 2: JP 2000-7455 A

DISCLOSURE OF THE INVENTION

The present invention has been developed in view of such a conventional situation, and an objective thereof is to provide a method for preparing a honeycomb segment joined body, in which in a case where a new honeycomb segment is installed in a predetermined position in a process of successively installing honeycomb segments in predetermined positions, even when a pressurizing force is generated from the new honeycomb segment to the already installed honeycomb segment, the installed honeycomb segment is not displaced, and the honeycomb segment joined body having an orderly shape can be obtained.

To achieve the above objective, according to the present invention, the following method of preparing the honeycomb segment joined body is provided.

[1] A method of preparing a honeycomb segment joined body in which a plurality of honeycomb segments are arranged in directions parallel to a first flat surface and a second flat surface of an installation reference jig to install the honeycomb segments in predetermined positions via a paste-like joining material on the installation reference jig by use of the installation reference jig having the first flat surface and the second flat surface forming a right angle therebetween, and then the joining material is dried and cured to join the plurality of honeycomb segments together, wherein when a new honeycomb segment is installed in at least a part of a process of successively installing the plurality of honeycomb segments in the predetermined positions, at least a part of the installed honeycomb segments is pressurized to hold the honeycomb segments in the predetermined positions so that the already installed honeycomb segments are not displaced.

[2] The method of preparing the honeycomb segment joined body according to [1], wherein at least a part of the installed honeycomb segments is pressurized from the direction parallel to the first flat surface and/or the direction parallel to the second flat surface to hold the honeycomb segments in the predetermined positions.

[3] The method of preparing the honeycomb segment joined body according to [1] or [2], wherein all the installed honeycomb segments present in positions as much as one honeycomb segment closer to the first flat surface from the installation position of the honeycomb segment to be newly installed are pressurized from the direction parallel to the first flat surface toward the second flat surface to hold the honeycomb segments in the predetermined positions.

[4] The method of preparing the honeycomb segment joined body according to any one of [1] to [3], wherein all the installed honeycomb segments present in positions as much as one honeycomb segment closer to the second flat surface from the installation position of the honeycomb segment to be newly installed are pressurized from the direction parallel to the second flat surface toward the first flat surface to hold the honeycomb segments in the predetermined positions.

[5] The method of preparing the honeycomb segment joined body according to any one of [1] to [4], wherein a spacer which keeps a space having a predetermined dimension between the honeycomb segments is attached to the outer wall surface of one of the adjacent honeycomb segments, and the spacer comes in contact with the outer wall surface of the facing honeycomb segment to exert such a pressurizing force that the spacer, the outer wall surface to which the spacer has been attached and the outer wall surface which comes in contact with the spacer are not damaged.

[6] The method of preparing the honeycomb segment joined body according to any one of [1] to [4], wherein spacers each of which keeps a space having a predetermined dimension between the honeycomb segments are attached to the outer wall surfaces of both of the adjacent honeycomb segments, and the spacers come in contact with each other to exert such a pressurizing force that the spacers and the outer wall surfaces to which the spacers have been attached are not damaged.

According to the present invention, in a case where the new honeycomb segment is installed in the predetermined position, even when the pressurizing force is generated from the new honeycomb segment to the already installed honeycomb segment, the installed honeycomb segment is pressurized and held in the predetermined position, and hence any displacement is not generated. Consequently, a honeycomb segment joined body having an orderly shape without the displacement of any honeycomb segment can be obtained. The present invention is especially effective for preparing the honeycomb segment joined body for a large DPF in which a large number of honeycomb segments are joined together and hence the positions of the segments are easily displaced.

EXPLANATION OF REFERENCE NUMERALS 1 to 16: honeycomb segment, 20: installation reference jig, 2: first flat surface, 22: second flat surface, 23: pad, 25: installation means, 26: pressurizing means, 29: joining material, 30: honeycomb segment, 31: cell, 32: partition wall, 33: outer wall and 35: plugging portion.

BEST MODE FOR CARRYING OUT THE INVENTION

The present invention will hereinafter be described in accordance with a specific embodiment, but the present invention is not limited to this embodiment when interpreted, and the present invention can variously be altered, modified or improved based on the knowledge of any person skilled in the art without departing from the scope of the present invention.

In a method of preparing a honeycomb segment joined body according to the present invention, in the same manner as in the above conventional method, an installation reference jig 20 having two flat surfaces (a first flat surface 21 and a second flat surface 22) forming a right angle therebetween as shown in FIG. 5 is used. On the installation reference jig 20, a plurality of honeycomb segments 30 are arranged via a paste-like joining material 29 in a direction parallel to the first flat surface 21 and a direction parallel to the second flat surface 22 and installed in predetermined positions, and then the joining material 29 is dried and cured. However, as a characteristic constitution different from the conventional method, in at least a part of a process of successively installing the plurality of honeycomb segments in the predetermined positions, when a new honeycomb segment is installed, at least a part of the installed honeycomb segments is pressurized and held in the predetermined positions so that the already installed honeycomb segments are not displaced.

The first flat surface 21 and the second flat surface 22 are provided with pads 23 which come in contact with the honeycomb segments 30 if necessary. It is to be noted that in the example of FIG. 5, the first flat surface 21 of the installation reference jig 20 is parallel to a horizontal direction, and the second flat surface 22 is parallel to a vertical direction. However, there is not any special restriction on the directions of the first flat surface 21 and the second flat surface 22, as long as the flat surfaces form a right angle therebetween and the honeycomb segments can be mounted on the flat surfaces. As shown in, for example, FIG. 6, the installation reference jig may be used so that each of the first flat surface 21 and the second flat surface 22 forms an angle of 45° with respect to a horizontal plane.

The pressurizing and holding of the installed honeycomb segment for preventing displacement does not have to be performed in the whole process of successively installing the plurality of honeycomb segments in the predetermined positions. As shown in, for example, FIG. 7, in a case where 16 honeycomb segments 1 to 16 in total are installed in reference numeral order in four rows along the direction parallel to the first flat surface 21 and four rows along the direction parallel to the second flat surface 22, even when the pressurizing and holding are not especially performed, the displacement is hardly caused until the honeycomb segment 7 is installed. The honeycomb segments 1 to 7 except the honeycomb segment 5 are installed so as to come in contact with the pads 23 provided on the first flat surface 21 and the second flat surface 22 of the installation reference jig 20 (installed so as to come in contact with the first flat surface 21 and the second flat surface 22 in a case where any pad 23 is not provided). Therefore, even when the honeycomb segment 5 exerts a pressurizing force during the installation of the honeycomb segment 5, the honeycomb segments hardly move owing to frictional resistance to the pads 23 (the first flat surface 21 and the second flat surface 22 in a case where the pads 23 are not provided).

Figure 1:
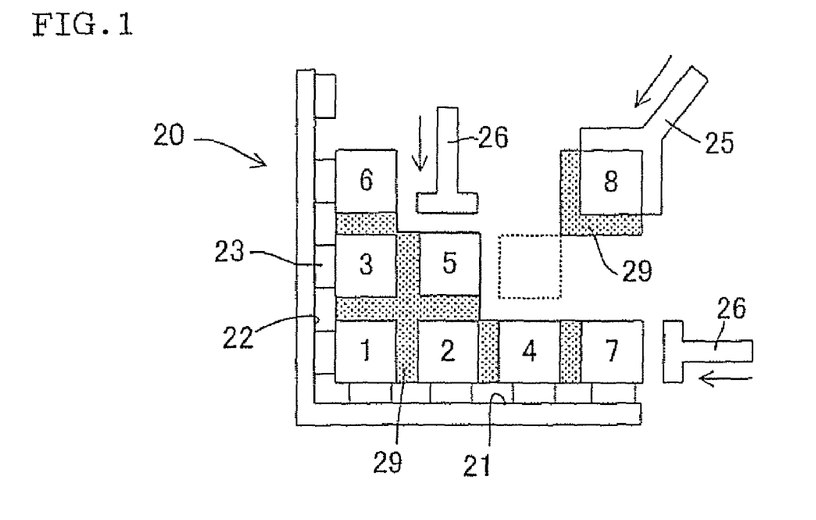
FIG. 1 is an explanatory view showing a state of a honeycomb segment installation process in the present invention.

FIG. 1 shows a state in a case where the honeycomb segment 8 is installed. To install the honeycomb segment, it is preferable to use installation means 25 capable of grasping, sucking or otherwise holding the honeycomb segment to move the honeycomb segment to a predetermined installation position. The outer wall surfaces of the honeycomb segment 8 to be newly installed which face the outer wall surfaces of the already installed honeycomb segments 5 and 4 are coated with the paste-like joining material 29, before the new honeycomb segment is installed in a predetermined position shown by a dotted line. The coating amount of the joining material 29 is set to such an amount that a gap between the adjacent honeycomb segments 5 and 4 can be filled in a case where the honeycomb segment 8 is installed in the predetermined position, that is, an amount equal to or slightly larger than the volume of the gap. When the coating amount is excessively small, the gap between the honeycomb segments is not sufficiently filled with the joining material, and finally any satisfactory joined state cannot be obtained.

After coating the surfaces with the joining material 29 in this manner, the installation means 25 holds and moves the honeycomb segment 8 to the predetermined position shown by the dotted line to install the honeycomb segment 8 while allowing the joining material to flow between the adjacent honeycomb segments 5 and 4. During this installation, a pressurizing force is generated from the honeycomb segment 8 to the already installed honeycomb segments. The honeycomb segment which is most easily displaced owing to this pressurizing force is the honeycomb segment 5 which does not come in contact with the pad 23. Therefore, this honeycomb segment 5 is pressurized from the direction parallel to the second flat surface 22 toward the first flat surface 21, held in the predetermined position and prevented from being displaced. Moreover, the honeycomb segment 4 and the adjacent honeycomb segment 7 come in contact with the pads 23, but might be displaced. Therefore, the honeycomb segment 7 is pressurized from the direction parallel to the first flat surface 21 toward the second flat surface 22 and held in the predetermined position.

In a case where the installed honeycomb segments are pressurized and held in this manner to prevent the displacement, even when the honeycomb segment 8 is coated with the excessive amount of the joining material 29, the excessive joining material 29 does not expand a gap between the honeycomb segments 2 and 5 or a gap between the honeycomb segments 2 and 4. The material flows along the side surface of the honeycomb segment 5 and the upper surface of the honeycomb segment 4, and is discharged to an opening, so that the displacement can be avoided.

During the pressurizing and holding of these honeycomb segments, pressurizing means 26 such as a pressurizing cylinder is preferably used. To install the new honeycomb segment, the pressurizing force for pressurizing and holding the honeycomb segment is preferably equal to or larger than the pressurizing force generated with respect to the installed honeycomb segment.

It is to be noted that when this pressurizing force is excessively large, the honeycomb segment might be displaced owing to the pressurizing force. Therefore, as means for preventing this problem, preferably, a spacer for keeping a space having a predetermined dimension between the honeycomb segments is attached to the outer wall surface of one of the adjacent honeycomb segments during the installation, and the spacer comes in contact with the outer wall surface of the facing honeycomb segment to exert such a pressurizing force that the spacer, the outer wall surface to which the spacer has been attached and the outer wall surface which comes in contact with the spacer are not damaged. Alternatively, spacers each of which keeps a space having a predetermined dimension between the honeycomb segments may be attached to the outer wall surfaces of both of the adjacent honeycomb segments during the installation, and the spacers may come in contact with each other to exert such a pressurizing force that the spacers and the outer wall surfaces to which the spacers have been attached are not damaged.

Figure 2:
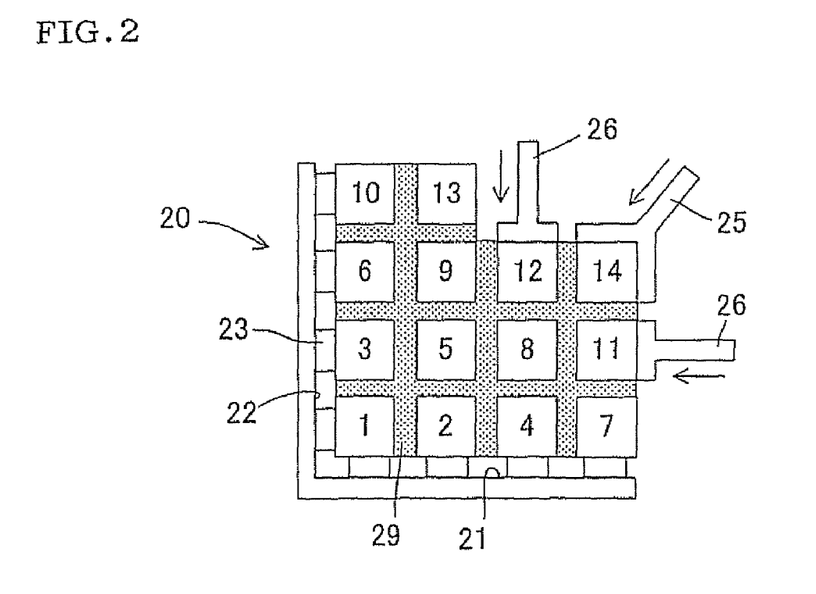
FIG. 2 is an explanatory view showing a state of the honeycomb segment installation process in the present invention.

FIG. 2 shows a state during the installation of the honeycomb segment 14. When the honeycomb segment 14 is installed, a large pressurizing force is generated from the honeycomb segment 14 to the installed adjacent honeycomb segments 11 and 12. Therefore, the honeycomb segment 11 is pressurized from the direction parallel to the first flat surface 21 toward the second flat surface 22, and the honeycomb segment 12 is pressurized from the direction parallel to the second flat surface 22 toward the first flat surface 21 and held in the predetermined position, thereby preventing the displacement. It is to be noted that when the honeycomb segment 11 is pressurized from the direction parallel to the first flat surface 21, the other honeycomb segments 3, 5 and 8 installed in the same column (stage) are pressurized together in the direction, and the positions of these honeycomb segments are held. Similarly, when the honeycomb segment 12 is pressurized from the direction parallel to the second flat surface 22 as described above, the other honeycomb segments 4, 8 installed in the same column are pressurized together in the direction, and the positions of these honeycomb segments are held.

Figure 3:
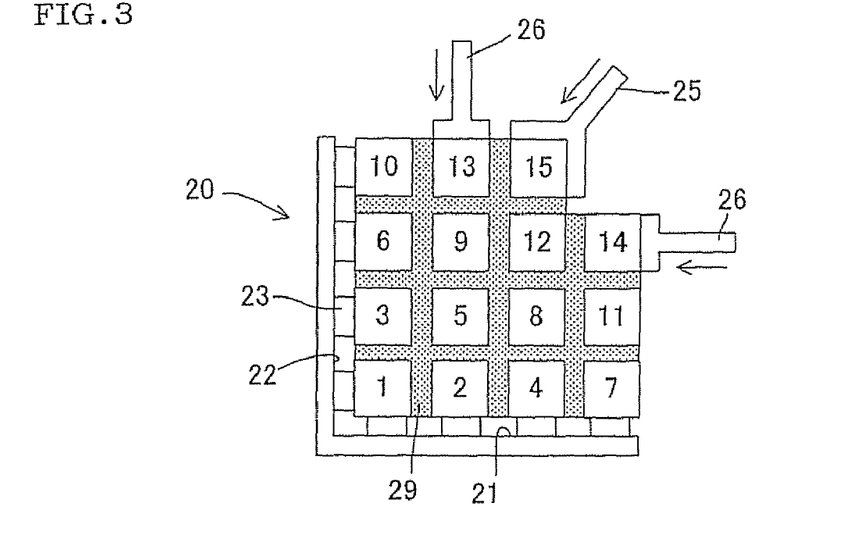
FIG. 3 is an explanatory view showing a state of the honeycomb segment installation process in the present invention.

FIG. 3 shows a state during the installation of the honeycomb segment 15. When the honeycomb segment 15 is installed, a large pressurizing force is generated from the honeycomb segment 15 to the installed adjacent honeycomb segments 12 and 13. Therefore, the honeycomb segment 14 adjacent to the honeycomb segment 12 in the direction parallel to the first flat surface 21 is pressurized from the direction parallel to the first flat surface 21 toward the second flat surface 22, and the honeycomb segment 13 is pressurized from the direction parallel to the second flat surface 22 toward the first flat surface 21 and held in the predetermined position, thereby preventing the displacement. It is to be noted that when the honeycomb segment 14 is pressurized from the direction parallel to the first flat surface 21 as described above, the other honeycomb segments 6, 9 and 12 installed in the same column (stage) are pressurized together in the direction, and the positions of these honeycomb segments are held. Similarly, when the honeycomb segment 13 is pressurized from the direction parallel to the second flat surface 22 as described above, the other honeycomb segments 2, 5 and 9 installed in the same column are pressurized together in the direction, and the positions of these honeycomb segments are held.

Figure 4:
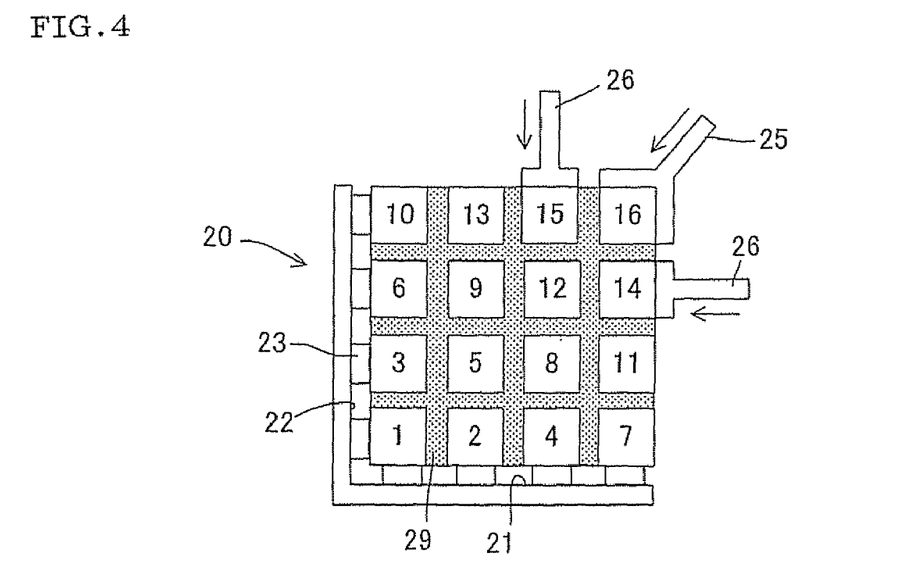
FIG. 4 is an explanatory view showing a state of the honeycomb segment installation process in the present invention.

FIG. 4 shows a state during the installation of the last honeycomb segment 16. When the honeycomb segment 16 is installed, a large pressurizing force is generated from the honeycomb segment 16 to the installed adjacent honeycomb segments 14 and 15. Therefore, the honeycomb segment 14 is pressurized from the direction parallel to the first flat surface 21 toward the second flat surface 22, and the honeycomb segment 15 is pressurized from the direction parallel to the second flat surface 22 toward the first flat surface 21 and held in the predetermined position, thereby preventing the displacement. It is to be noted that when the honeycomb segment 14 is pressurized from the direction parallel to the first flat surface 21 as described above, the other honeycomb segments 6, 9 and 12 installed in the same column (stage) are pressurized together in the direction, and the positions of these honeycomb segments are held. Similarly, when the honeycomb segment 15 is pressurized from the direction parallel to the second flat surface 22 as described above, the other honeycomb segments 4, 8 and 12 installed in the same column are pressurized together in the direction, and the positions of these honeycomb segments are held.

As seen from the above description, in a case where the honeycomb segment is newly installed, to prevent the displacement of the already installed honeycomb segment, (1) all the installed honeycomb segments present in positions as much as one honeycomb segment closer to the first flat surface from the installation position of the newly installed honeycomb segment are pressurized from the direction parallel to the first flat surface toward the second flat surface, or (2) all the installed honeycomb segments present in positions as much as one honeycomb segment closer to the second flat surface from the installation position of the newly installed honeycomb segment are pressurized from the direction parallel to the second flat surface toward the first flat surface. This is effective, and (1) and (2) are especially preferably simultaneously performed.

Figure 9:
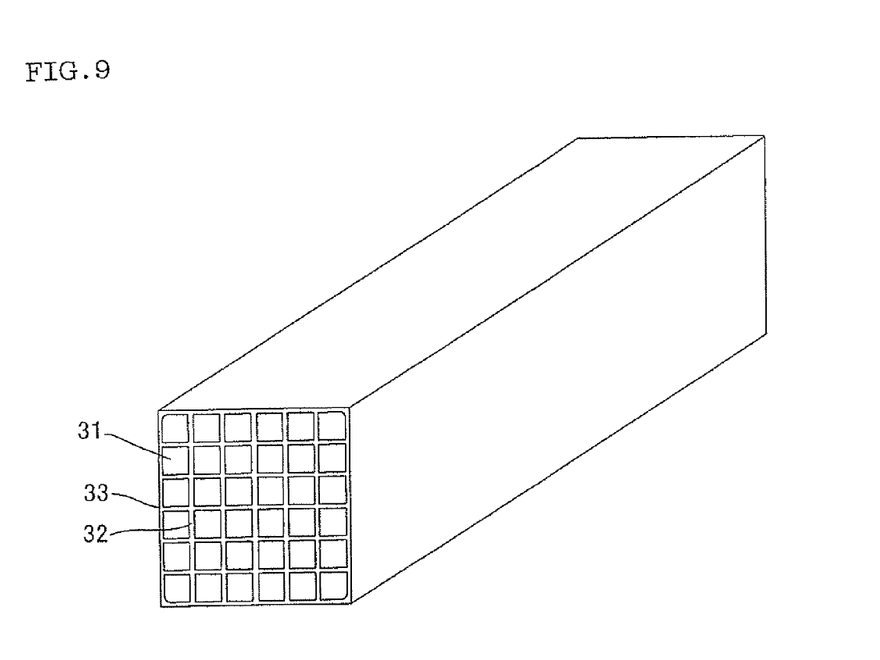
FIG. 9 is a perspective view showing one example of honeycomb segments for use in the present invention.

As shown in FIG. 9, the honeycomb segment for use in the present invention includes porous partition walls 32 which separate a plurality of cells 31 connecting two end faces to each other, and an outer wall 33 which surrounds the partition walls.

Figure 10:
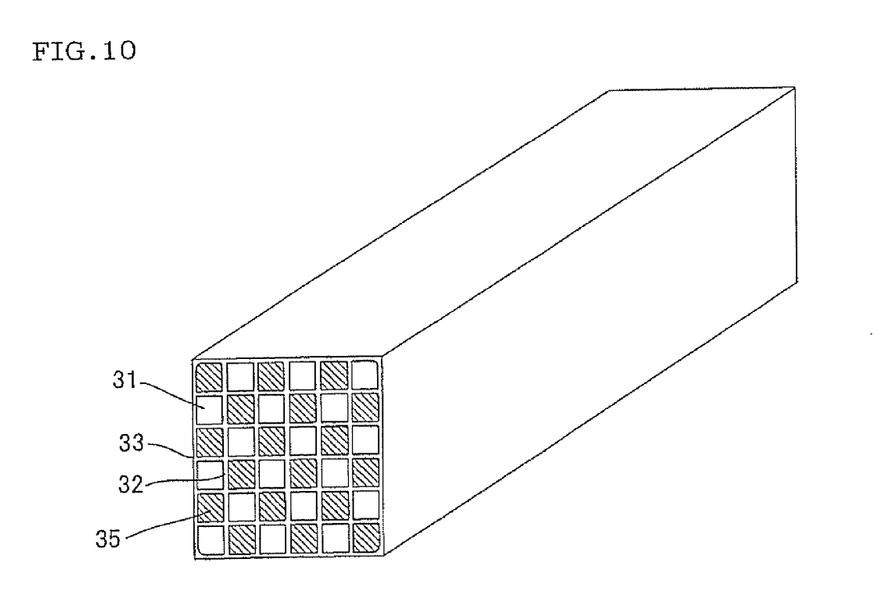
FIG. 10 is a perspective view showing another example of the honeycomb segments for use in the present invention.

In a case where a honeycomb segment joined body obtained according to the present invention is used as a dust collecting filter such as a DPF, as shown in FIG. 10, plugging portions 35 are preferably formed each of which plugs one end of each of the cells 31 in one of two end faces of the honeycomb segment. The adjacent cells are usually alternately plugged so that one end face and the other end face exhibit complementary checkered patterns.

In a case where a fluid including particulates of soot or the like is supplied from one end face of the honeycomb segment joined body constituted of the honeycomb segments subjected to the plugging in this manner, the fluid flows into the honeycomb segment joined body from the cells whose ends are not plugged on one end face side, and the fluid passes through the porous partition walls having a filtering ability to enter another channel that is not plugged on the side of the other end face of the honeycomb segment joined body. Then, in a case where the fluid passes through the partition walls, the particulates in the fluid are trapped by the partition walls, and the purified fluid from which the particulates have been removed is discharged from the other end face of the honeycomb structure.

From the viewpoints of strength and thermal resistance, a preferable example of a material constituting the honeycomb segment is at least one type of material selected from the group consisting of silicon carbide (SiC), a silicon-silicon carbide based composite material formed using silicon carbide (SiC) as an aggregate and silicon (Si) as a coupling material, silicon nitride, cordierite, mullite, alumina, spinel, a silicon carbide-cordierite based composite material, lithium aluminum silicate, aluminum titanate and an Fe—Cr—Al based metal. Above all, is the honeycomb segment is preferably made of silicon carbide (SiC) or the silicon-silicon carbide based composite material. Moreover, as a material constituting the plugging portion, the same material as that of the honeycomb segment is preferably used so as to decrease a thermal expansion difference between the plugging portion and the honeycomb segment.

As a manufacturing method of the honeycomb segment, a heretofore known method may be used. As one specific example of the method, a binder such as methyl cellulose, hydroxypropoxyl cellulose, hydroxyethyl cellulose, carboxymethyl cellulose or polyvinyl alcohol, a pore former, a surfactant, water as a solvent or the like is added to the above material to obtain clay having plasticity. This clay is extruded into a predetermined honeycomb shape. Subsequently, after drying with microwaves, hot air or the like, firing is performed. To form plugging portions in cells, the firing may be performed before forming the plugging portions in the cells, or the firing may be performed together with the firing of the plugging portions after forming the plugging portions in the cells.

A heretofore known method may be used as a method for plugging the cells. As one specific example of the method, after attaching a sheet to the end face of the honeycomb segment, holes are made in positions of the sheet corresponding to the cells to be plugged. In a state in which this sheet is attached, the end face of the honeycomb segment is immersed into a plugging slurry in which the plugging portion constituting material is slurried, and the open ends of the cells to be plugged are filled with the plugging slurry through the holes made in the sheet. Afterward, the honeycomb segment is dried and/or fired and cured.

As a joining material, a material mainly composed of a filler including ceramic fibers, ceramic particles or the like having thermal resistance, and an inorganic adhesive such as colloidal silica is preferable. Furthermore, if necessary, an organic binder (e.g., methyl cellulose (MC), carboxymethyl cellulose (CMC) or the like), a dispersant, water or the like is added to the material. The material is mixed and kneaded into a paste-like state by use of a kneader such as a mixer.

Afterward, the outer peripheral portion of the honeycomb segment joined body obtained by installing all the honeycomb segments in the predetermined positions and then drying and curing the joining material may be ground, if necessary, and processed into a desired shape such as a columnar shape. It is to be noted that in this case, an outer peripheral wall is removed by this processing, and inner partition walls and cells are exposed. Therefore, the outer peripheral wall is preferably formed again by coating exposed surfaces with a coating material or the like.

INDUSTRIAL APPLICABILITY

The present invention is preferably usable as a method of preparing a honeycomb segment joined body for use as a dust collecting filter such as a DPF.

The invention claimed is:

1. A method of preparing a honeycomb segment joined body in which a plurality of honeycomb segments are arranged in directions parallel to a first flat surface and a second flat surface of an installation reference jig, comprising:

successively installing the honeycomb segments in predetermined positions via a paste-like joining material on the installation reference jig, the first flat surface and the second flat surface of the installation reference jig forming a right angle therebetween;

directly applying a pressure to at least some of the honeycomb segments that have been previously installed in order to hold the previously installed honeycomb segments in the predetermined positions so that the previously installed honeycomb segments are not displaced during the installation of each honeycomb segment; and drying and curing the joining material to join the plurality of honeycomb segments together after all of the honeycomb segments have been installed, wherein the pressure applied to at least some of the honeycomb segments that have been previously installed is applied via a pressure applying device that makes direct contact with the previously installed honeycomb segments.

2. The method of preparing the honeycomb segment joined body according to claim 1, wherein at least a part of the installed honeycomb segments is pressurized from a direction parallel to the first flat surface and/or a direction parallel to the second flat surface to hold the honeycomb segments in the predetermined positions.

3. The method of preparing the honeycomb segment joined body according to claim 2, wherein all the installed honeycomb segments present in positions as much as one honeycomb segment closer to the first flat surface from the installation position of the honeycomb segment to be newly installed are pressurized from the direction parallel to the first flat surface toward the second flat surface to hold the honeycomb segments in the predetermined positions.

4. The method of preparing the honeycomb segment joined body according to claim 2, wherein all the installed honeycomb segments present in positions as much as one honeycomb segment closer to the second flat surface from the installation position of the honeycomb segment to be newly installed are pressurized from the direction parallel to the second flat surface toward the first flat surface to hold the honeycomb segments in the predetermined positions.

5. The method of preparing the honeycomb segment joined body according to claim 1, wherein a spacer which keeps a space having a predetermined dimension between the honeycomb segments is attached to an outer wall surface of one of the adjacent honeycomb segments, and the spacer comes in contact with an outer wall surface of a facing honeycomb segment to exert such a pressurizing force that the spacer, the outer wall surface to which the spacer has been attached and the outer wall surface which comes in contact with the spacer are not damaged.

6. The method of preparing the honeycomb segment joined body according to claim 2, wherein a spacer which keeps a space having a predetermined dimension between the honeycomb segments is attached to an outer wall surface of one of the adjacent honeycomb segments, and the spacer comes in contact with an outer wall surface of a facing honeycomb segment to exert such a pressurizing force that the spacer, the outer wall surface to which the spacers have been attached and the outer wall surface which comes in contact with the spacer are not damaged.

7. The method of preparing the honeycomb segment joined body according to claim 1, wherein spacers each of which keeps a space having a predetermined dimension between the honeycomb segments are attached to outer wall surfaces of both of the adjacent honeycomb segments, and the spacers come in contact with each other to exert such a pressurizing force that the spacers and the outer wall surfaces to which the spacers have been attached are not damaged.

8. The method of preparing the honeycomb segment joined body according to claim 2, wherein spacers each of which keeps a space having a predetermined dimension between the honeycomb segments are attached to outer wall surfaces of both of the adjacent honeycomb segments, and the spacers come in contact with each other to exert such a pressurizing force that the spacers and the outer wall surfaces to which the spacers have been attached are not damaged.

9. The method of preparing the honeycomb segment joined body according to claim 1, wherein at least two honeycomb segments of the honeycomb segments that have already been installed are pressurized from different directions to hold the honeycomb segments.

10. The method of preparing the honeycomb segment joined body according to claim 1, wherein at least two honeycomb segments of the honeycomb segments that have already been installed are simultaneously pressurized from different directions to hold the honeycomb segments.

* * * * *